United States Patent
Drees et al.

(10) Patent No.: US 11,042,171 B2
(45) Date of Patent: Jun. 22, 2021

(54) INTEGRATED SMART ACTUATOR DEVICE

(71) Applicant: Johnson Controls Technology Company, Auburn Hills, MI (US)

(72) Inventors: Kirk H. Drees, Cedarburg, WI (US); Herbert J. Doll, Whitefish Bay, WI (US); Gerald A. Duenkel, Grafton, WI (US); Marcello Passoni, Vimercate (IT); Russell T. Jenks, Racine, WI (US); Duane S. Freimuth, Franklin, WI (US); Kyle M. Bero, Milwaukee, WI (US); Kevin A. Weiss, Gurnee, IL (US); Abu Bakr Khan, Franklin, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/901,843

(22) Filed: Feb. 21, 2018

(65) Prior Publication Data

US 2018/0239371 A1    Aug. 23, 2018

Related U.S. Application Data

(60) Provisional application No. 62/462,283, filed on Feb. 22, 2017.

(51) Int. Cl.
*G05D 7/06* (2006.01)
*G05B 15/02* (2006.01)
(Continued)

(52) U.S. Cl.
CPC ........ *G05D 7/0635* (2013.01); *F16K 11/0873* (2013.01); *F16K 31/055* (2013.01);
(Continued)

(58) Field of Classification Search
CPC ........ G05D 7/0635; F24F 11/62; F24F 11/84; F24F 11/64; F24F 11/46; F24F 11/65;
(Continued)

(56) References Cited

U.S. PATENT DOCUMENTS 5,744,923 A * 4/1998 Strauss .................... G05B 9/02
                                                                 318/430
6,352,106 B1    3/2002 Hartman
(Continued)

FOREIGN PATENT DOCUMENTS

CN         1213062 A    4/1999
CN       102006820 A    4/2011
(Continued)

OTHER PUBLICATIONS

U.S. Appl. No. 15/261,843, filed Sep. 9, 2016, Johnson Controls Technology Company.
(Continued)

*Primary Examiner* — Thomas C Lee
*Assistant Examiner* — Michael Tang
(74) *Attorney, Agent, or Firm* — Foley & Lardner LLP

(57) ABSTRACT

A building management system is configured to modify an environmental condition of a building. The building management system includes a valve assembly, an actuator device, and a network sensor device. The actuator device includes a motor, a drive device driven by the motor and coupled to the valve assembly, and a controller coupled to the motor. The controller includes a microprocessor and a control application configured to enable closed loop control of the valve assembly. The network sensor device is communicably coupled to the actuator device and configured to measure an environmental property. The control application is configured to perform the closed loop control of the valve assembly based on an input control signal from a mobile (Continued)

device and the measured environmental property from the network sensor device.

21 Claims, 14 Drawing Sheets

(51) Int. Cl.
| | |
|---|---|
| F24F 11/64 | (2018.01) |
| F24F 11/46 | (2018.01) |
| F24F 11/58 | (2018.01) |
| F24F 11/65 | (2018.01) |
| F24F 11/70 | (2018.01) |
| F24F 11/84 | (2018.01) |
| F16K 11/087 | (2006.01) |
| F16K 31/05 | (2006.01) |
| F16K 31/60 | (2006.01) |
| F24F 11/30 | (2018.01) |
| F16K 37/00 | (2006.01) |
| F24F 11/62 | (2018.01) |
| F24F 110/10 | (2018.01) |
| F24F 140/40 | (2018.01) |
| F24F 140/50 | (2018.01) |
| F16K 31/04 | (2006.01) |
| F16K 11/08 | (2006.01) |
| F24F 11/56 | (2018.01) |
| F24F 110/00 | (2018.01) |

(52) U.S. Cl.
CPC .......... *F16K 31/602* (2013.01); *F16K 37/005* (2013.01); *F24F 11/30* (2018.01); *F24F 11/46* (2018.01); *F24F 11/58* (2018.01); *F24F 11/62* (2018.01); *F24F 11/64* (2018.01); *F24F 11/65* (2018.01); *F24F 11/70* (2018.01); *F24F 11/84* (2018.01); *G05B 15/02* (2013.01); *F16K 11/08* (2013.01); *F16K 31/041* (2013.01); *F24F 11/56* (2018.01); *F24F 2110/00* (2018.01); *F24F 2110/10* (2018.01); *F24F 2140/40* (2018.01); *F24F 2140/50* (2018.01); *G05B 2219/25011* (2013.01); *G05B 2219/2614* (2013.01)

(58) Field of Classification Search
CPC .. F24F 11/30; F24F 11/70; F24F 11/58; F24F 2140/40; F24F 2140/50; F24F 2110/00; F24F 11/56; F24F 2110/10; F16K 11/0873; F16K 31/055; F16K 31/602; F16K 37/005; F16K 11/08; F16K 31/041; G05B 15/02; G05B 2219/25011; G05B 2219/2614
See application file for complete search history.

(56) References Cited

U.S. PATENT DOCUMENTS

| | | | |
|---|---|---|---|
| 6,607,140 B1 | 8/2003 | Hartman | |
| 8,789,807 B2* | 7/2014 | Kreuter | F16K 31/041 251/291 |
| 9,746,199 B1 | 8/2017 | Drees et al. | |
| 9,872,412 B2* | 1/2018 | Mielnik | H05K 7/1474 |
| 2006/0207006 A1* | 9/2006 | Koga | E03D 9/08 4/420.4 |
| 2008/0078973 A1* | 4/2008 | Richards | E03B 7/071 251/315.1 |
| 2012/0147868 A1* | 6/2012 | Williams | H04W 4/38 370/338 |
| 2012/0211688 A1* | 8/2012 | Carlson | F16K 31/44 251/291 |
| 2013/0048264 A1* | 2/2013 | Lu | G05D 23/00 165/287 |
| 2013/0282150 A1* | 10/2013 | Panther | G05B 19/042 700/75 |
| 2014/0034145 A1 | 2/2014 | Burt et al. | |
| 2015/0137605 A1* | 5/2015 | Spivey | H02J 9/061 307/66 |
| 2015/0168000 A1 | 6/2015 | Dempster et al. | |
| 2015/0226343 A1* | 8/2015 | Jenks | F17D 3/00 137/1 |
| 2016/0003489 A1 | 1/2016 | Casper et al. | |
| 2016/0003561 A1 | 1/2016 | Casper et al. | |
| 2016/0231721 A1* | 8/2016 | Lakshmanan | H01H 71/00 |
| 2017/0191574 A1* | 7/2017 | Takamatsu | F16K 11/076 |
| 2017/0295058 A1 | 10/2017 | Gottschalk et al. | |
| 2018/0173179 A1* | 6/2018 | Basterash | G05B 15/02 |

FOREIGN PATENT DOCUMENTS

| | | |
|---|---|---|
| EP | 2 294 487 A1 | 3/2011 |
| WO | WO-2010/000077 A1 | 1/2010 |

OTHER PUBLICATIONS

U.S. Appl. No. 15/716,101, filed Sep. 26, 2017, Johnson Controls Technology Company.
U.S. Appl. No. 15/716,947, filed Sep. 27, 2017, Johnson Controls Technology Company.
U.S. Appl. No. 15/717,195, filed Sep. 27, 2017, Johnson Controls Technology Company.
U.S. Appl. No. 15/717,252, filed Sep. 27, 2017, Johnson Controls Technology Company.
International Search Report and Written Opinion on International Patent Application No. PCT/US2018/019058 dated May 9, 2018. 12 pages.
Office Action on CN 201880025088.9, dated Sep. 30, 2020, 27 pages with English translation.

* cited by examiner

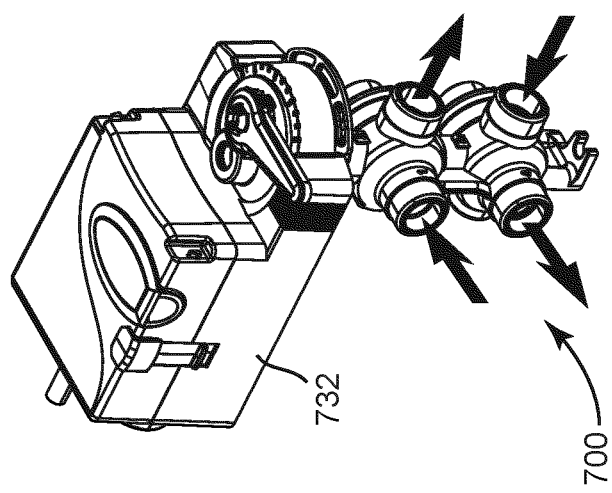 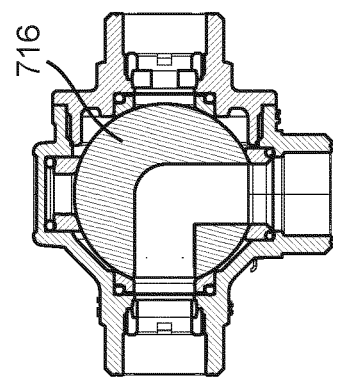
Cold Water Flow  FIG. 7B
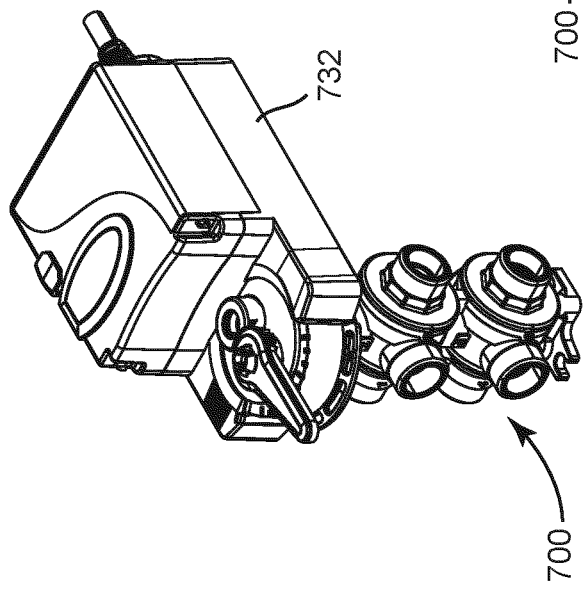 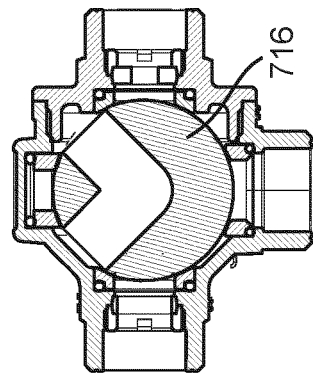
No Water Flow  FIG. 7C
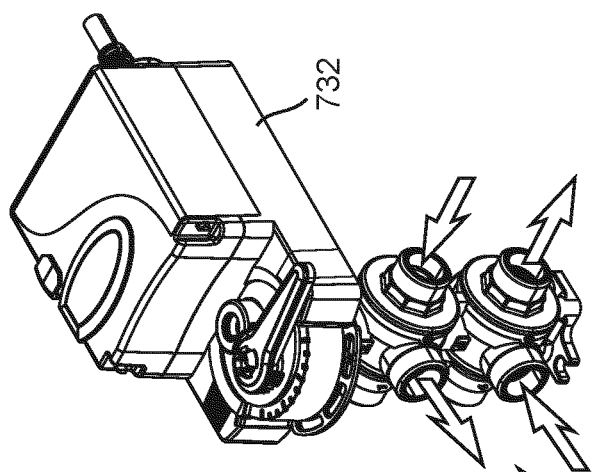 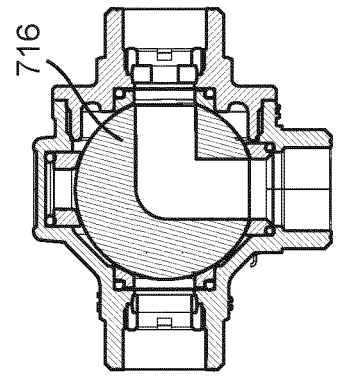
Hot Water Flow  FIG. 7D

INTEGRATED SMART ACTUATOR DEVICE

CROSS REFERENCE TO RELATED APPLICATIONS

The present application claims the benefit of U.S. Provisional Application No. 62/462,283, filed Feb. 22, 2017, which is incorporated herein by reference in its entirety.

BACKGROUND

The present invention relates generally to building management systems and associated devices and more particularly to an integrated actuator HVAC devices with wireless communications and control capabilities.

HVAC actuators are used to operate a wide variety of HVAC components such as air dampers, fluid valves, air handling units, and other components that are typically used in HVAC systems. For example, an actuator can be coupled to a damper, valve, or other movable equipment in a HVAC system and can be used to drive the equipment between an open position and a closed position. An actuator typically includes a motor and a drive device (e.g., a hub, a drive train, etc.) that is driven by the motor and coupled to the HVAC component.

However, many existing HVAC actuators are largely mechanical devices that fail to take advantage of recent advances in processing and wireless communications technology. In particular, current HVAC actuators have failed to capitalize on improvements to embedded microprocessors for circuit boards. These improvements have resulted in control and wireless communications capabilities that may be packaged in form factors small enough to fit within existing actuator housings. It would be advantageous to increase the functionality of HVAC actuator devices. At the same time, it would be advantageous to decrease the overall number of devices a technician must install and maintain in an HVAC system.

SUMMARY

One implementation of the present disclosure is a building management system configured to modify an environmental condition of a building. The building management system includes a valve assembly, an actuator device, and a network sensor device. The actuator device includes a motor, a drive device driven by the motor and coupled to the valve assembly, and a controller coupled to the motor. The controller includes a microprocessor and a control application configured to enable closed loop control of the valve assembly. The network sensor device is communicably coupled to the actuator device and configured to measure an environmental property. The control application is configured to perform the closed loop control of the valve assembly based on an input control signal from a mobile device and the measured environmental property from the network sensor device.

In some embodiments, the building management system includes a mobile access point device configured to communicably couple to the network sensor device and to receive the input control signal from the mobile device.

In some embodiments, the controller is further configured to wirelessly couple to the mobile device to receive the input control signal.

In some embodiments, the valve assembly includes a valve member rotatable along an angular travel of approximately 270 degrees between a first end position in which a first port is fluidly connected with a third port and a second port is closed and a second end position in which the second port is fluidly connected with the third port and the first port is closed. In other embodiments, the drive device is configured to drive the valve member along the angular travel of approximately 270 degrees.

In some embodiments, the building management system includes a network automation engine device communicably coupled to the actuator device and configured to perform equipment monitoring and control functions. Equipment monitoring and control functions may include a scheduling function, an alarm management function, an event management function, an energy management function, a data exchange function, a data trending function, and a data storage function.

In some embodiments, the valve assembly is configured to control a flow of water through a heating coil or a cooling coil.

In some embodiments, the controller is communicably coupled to multiple input and output signals. The input and output signals may include a discharge air input signal, a condensation input signal, an analog fan output signal, a fan cutout relay output signal, and an analog damper output signal.

Another implementation of the present disclosure is a method for controlling a building management system including a valve assembly, an actuator device, and a network sensor device. The method includes receiving an input control signal from a mobile device, receiving a measured environmental property from the network sensor device, determining an actuator position setpoint based on the input control signal and the measured environmental property, and driving the actuator device to the actuator position setpoint. The actuator device is coupled to the valve assembly in order to drive the valve assembly between multiple positions.

In some embodiments, the valve assembly includes a valve body having a valve chamber and multiple ports into the valve chamber, and a valve member located within the valve chamber. The valve member is controllably rotatable about a rotational axis. In other embodiments, wherein the valve member is rotatable along an angular travel of approximately 270 degrees between a first end position in which a first port is fluidly connected with a third port and a second port is closed and a second end position in which the second port is fluidly connected with the third port and the first port is closed.

In some embodiments, the method is performed by a controller of the actuator device. In other embodiments, the controller includes a microcontroller with memory and a processor configured to execute a control application, and a control application configured to enable closed loop control of the valve assembly.

Still another implementation of the present disclosure is a modular actuator device for use in a building management system configured to modify an environmental condition of a building. The modular actuator device includes an actuator circuit card assembly with components configured to drive an actuator motor, a processor circuit card assembly with components configured to perform closed loop control functions, and an input output circuit card assembly with components configured to communicably couple the modular actuator device to multiple input and output signals. Each of the actuator circuit card assembly, the processor circuit card assembly, and the input output circuit card assembly are configured to be separately replaceable to achieve one or more desired functions of the modular actuator device.

In some embodiments, the input and output signals include a discharge air input signal, a condensation input signal, an analog fan output signal, a fan cutout relay output signal, and an analog damper output signal.

In some embodiments, the components configured to drive an actuator motor cause the actuator motor to drive a drive device along an angular travel of approximately 270 degrees.

In some embodiments, the components configured to perform closed loop control functions include a microprocessor. In other embodiments, the microprocessor is configured to wirelessly couple to a mobile device to receive an input control signal. In further embodiments, the microprocessor is configured to wirelessly couple to a network automation engine device configured to perform equipment monitoring and control functions. Equipment monitoring and control functions may include a scheduling function, an alarm management function, an event management function, an energy management function, a data exchange function, a data trending function, and a data storage function

BRIEF DESCRIPTION OF THE DRAWINGS

FIGS. 7B-7D are a series of perspective view drawings of orientations of the smart actuator and the valve member, according to some embodiments.

DETAILED DESCRIPTION

Overview

Before turning to the FIGURES, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the FIGURES, various integrated smart actuator devices and their applications are depicted, according to some embodiments. Smart actuators are actuator devices that include embedded processing capabilities that can perform control loop functions. In some embodiments, the smart actuator device is coupled to a valve (e.g., a six-way 270° valve). In other embodiments, smart actuator devices may be implemented as part of a building management system (e.g., a modular liquid-based heating and cooling system) to control HVAC components including fan coil units, blower coil units, and air handling units.

Building Management System and HVAC System

Figure 1:
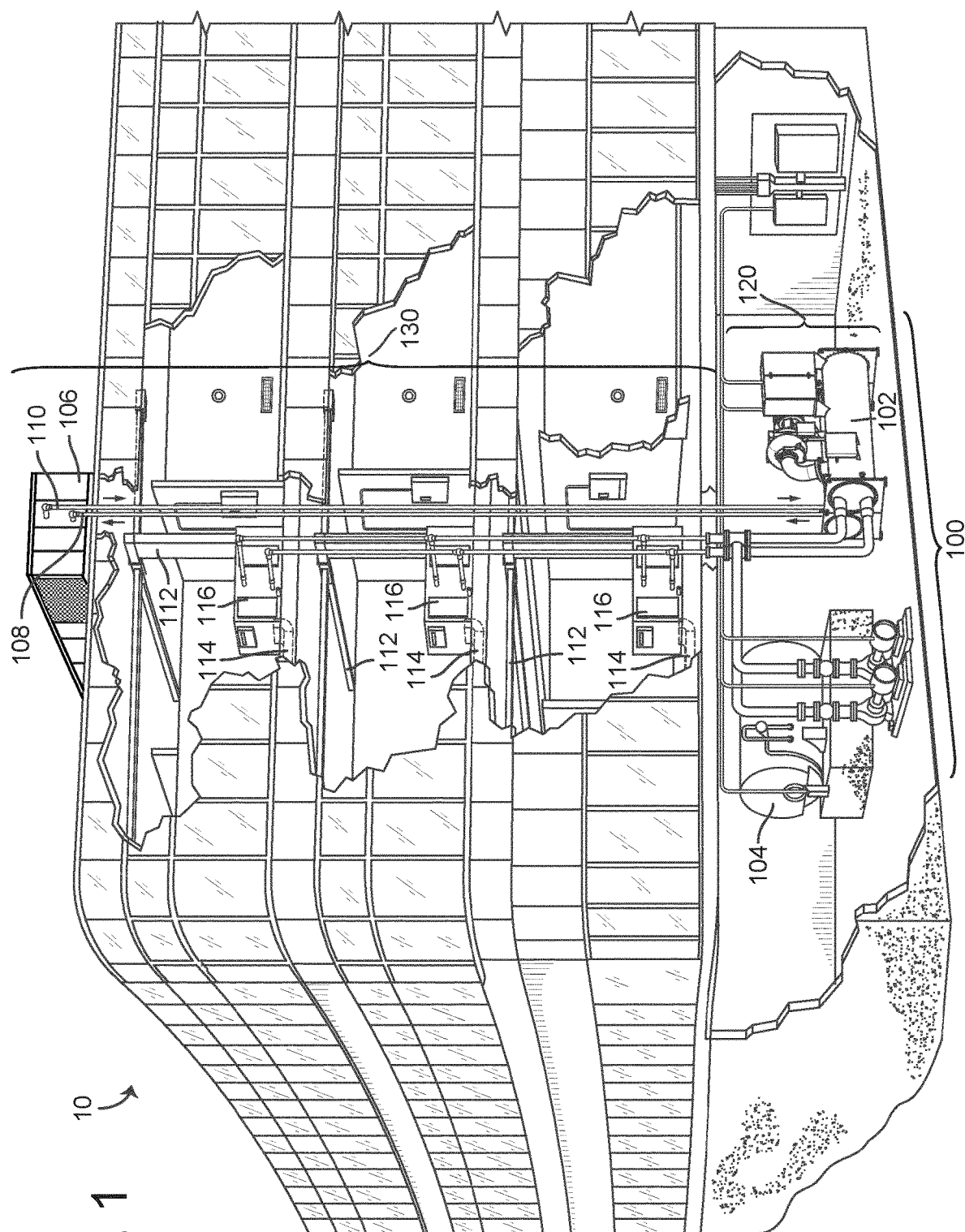
FIG. 1 is a drawing of a building equipped with a heating, ventilating, or air conditioning (HVAC) system and a building management system (BMS), according to some embodiments.

Referring now to FIGS. 1-4, an exemplary building management system (BMS) and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid.

The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
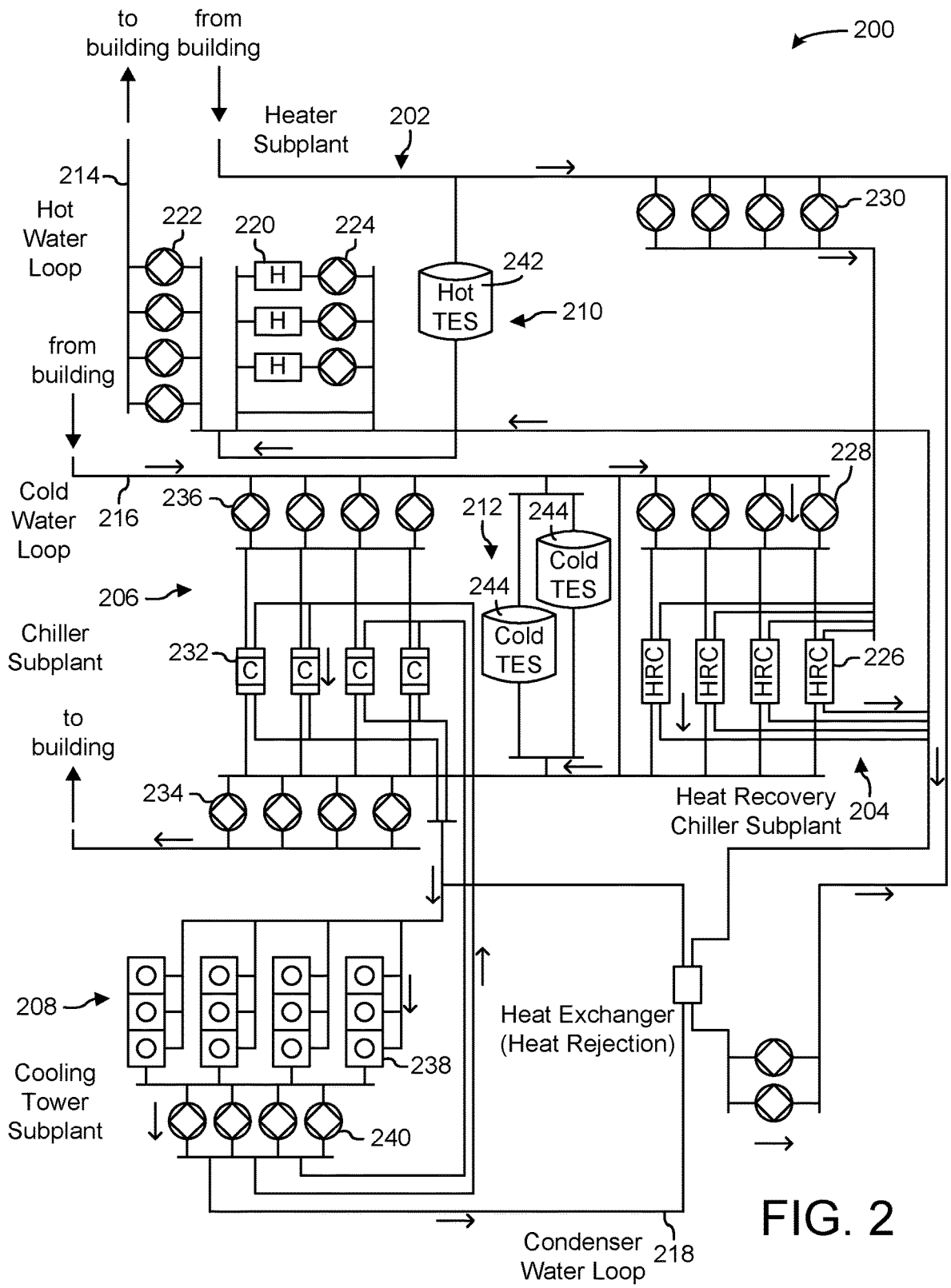
FIG. 2 is a schematic diagram of a waterside system that can be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
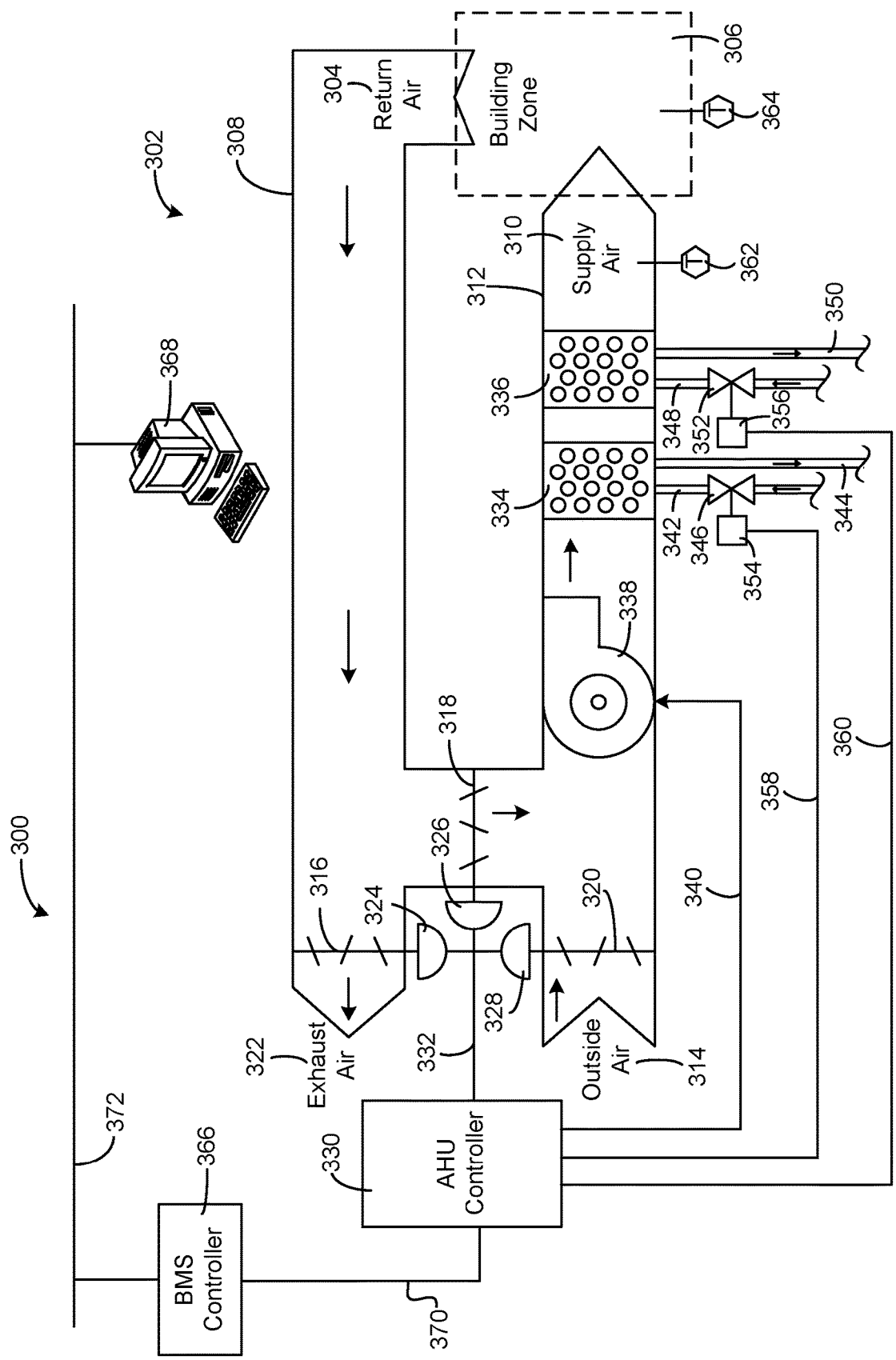
FIG. 3 is a block diagram of an airside system that can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
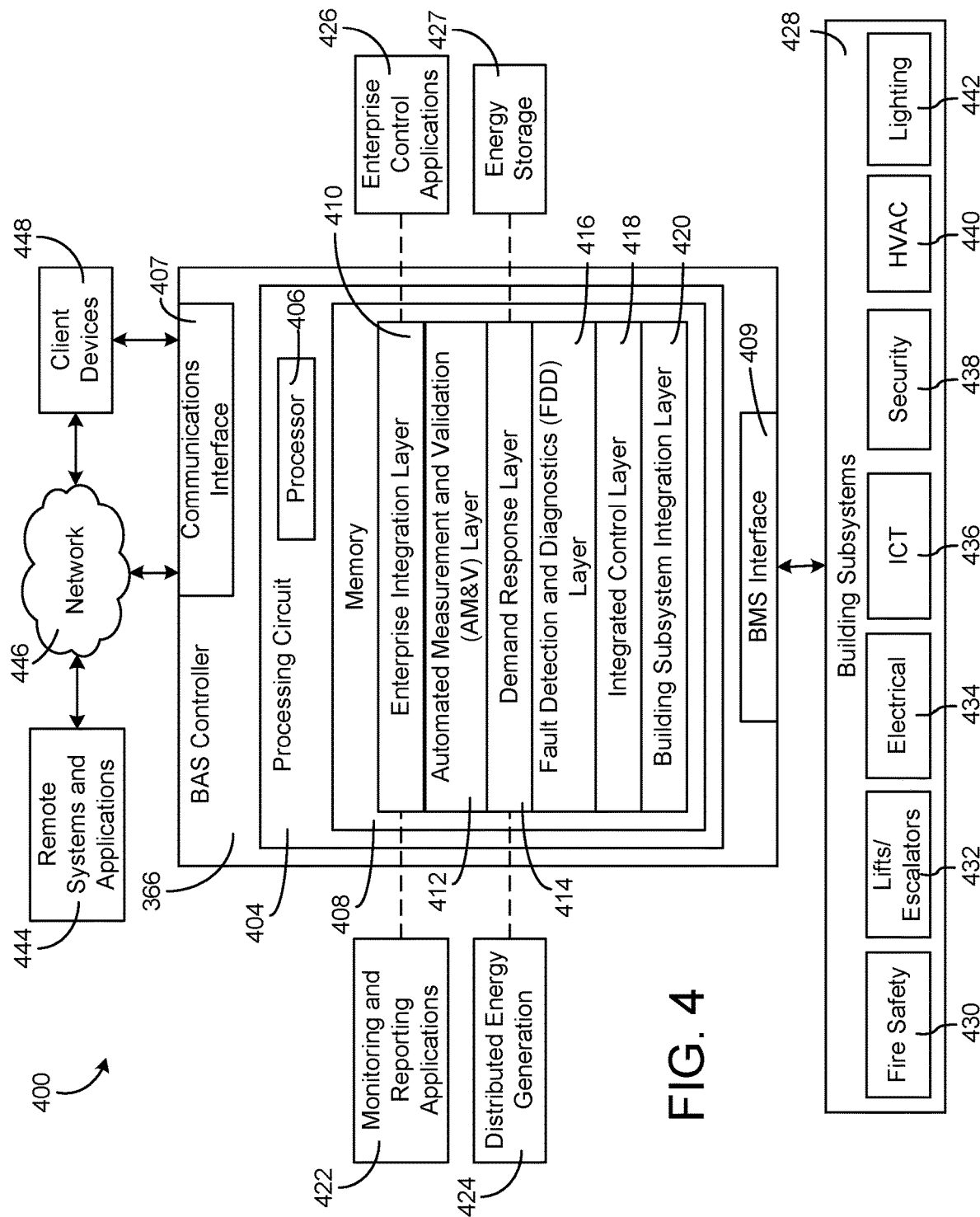
FIG. 4 is a block diagram of a BMS that can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Smart Actuator Device

Figure 5:
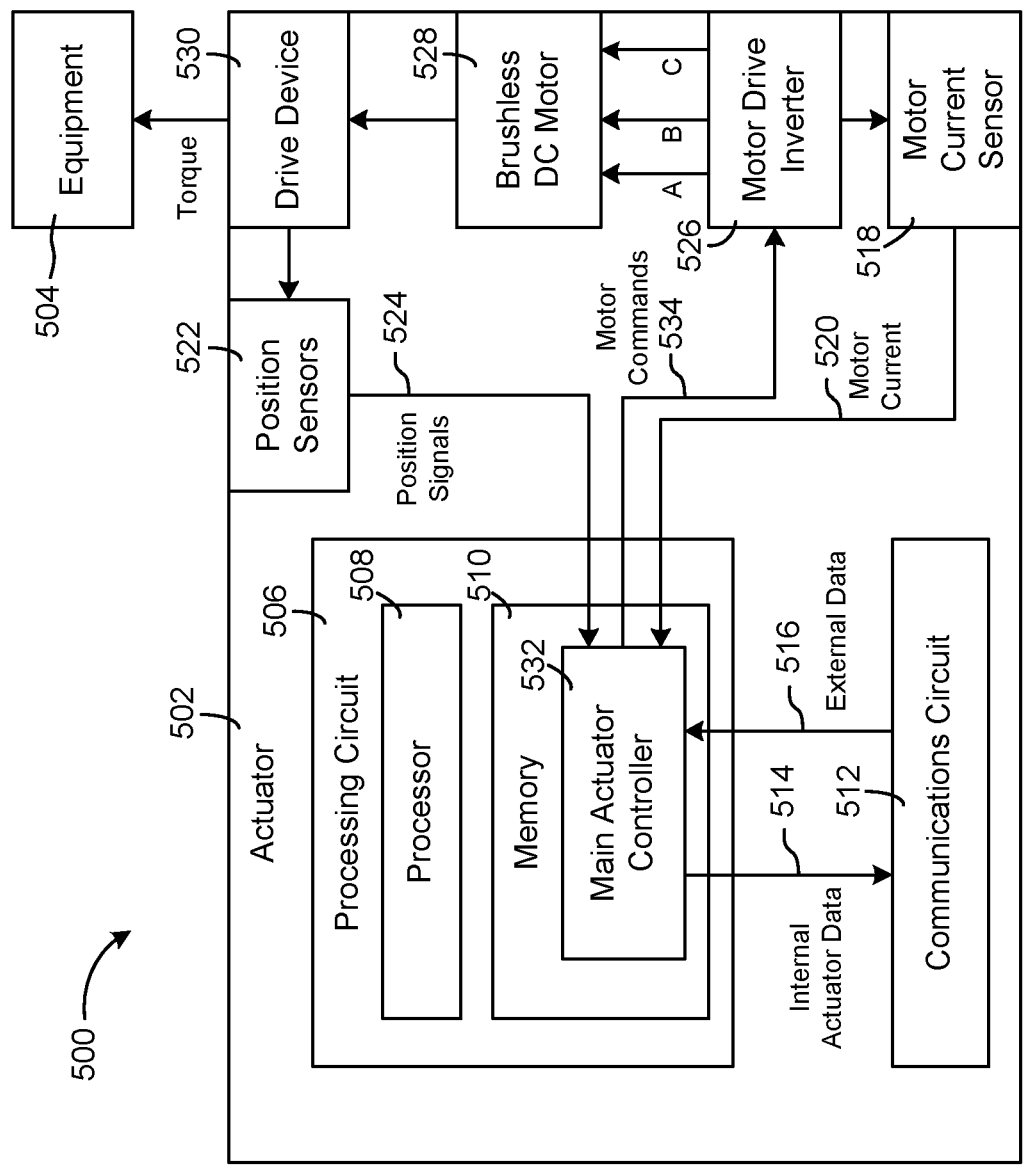
FIG. 5 is a block diagram of an integrated smart actuator device that can be implemented in the HVAC system of FIG. 1, according to some embodiments.

Turning now to FIG. 5, a block diagram of a smart actuator device 500 is shown, according to some embodiments. Smart actuator device 500 may be an actuator that performs control loop functions. Smart actuator device 500 may be used in HVAC system 100, waterside system 200, airside system 300, or BMS 400, as described with reference to FIGS. 1-4. For example, applications of smart actuator 500 may include pressure disturbance rejections in actuator control, fan coil control, hydronic system control, 6-way ball valve control for chilled beams, distributed air handling unit (AHU) control, variable water flow (VWF) control, and water system (BEWS) control. Actuator 502 may be configured to operate equipment 504. Equipment 504 may include any type of device that can be operated by an actuator. In an exemplary embodiment, actuator 502 and equipment 504 (e.g., a valve) are packaged within a common integrated device chassis. In other embodiments, actuator 502 and equipment 504 are packaged as separate components.

Actuator 502 is shown to include a processing circuit 506 communicably coupled to brushless DC (BLDC) motor 528. Processing circuit 506 is shown to include a processor 508, memory 510, and a main actuator controller 532. Processor 508 can be a general purpose or specific purpose processor, an application specific integrated circuit (ASIC), one or more field programmable gate arrays (FPGAs), a group of processing components, or other suitable processing components. Processor 508 can be configured to execute computer code or instructions stored in memory 510 or received from other computer readable media (e.g., CDROM, network storage, a remote server, etc.).

Memory 510 may include one or more devices (e.g., memory units, memory devices, storage devices, etc.) for storing data and/or computer code for completing and/or facilitating the various processes described in the present disclosure. Memory 510 may include random access memory (RAM), read-only memory (ROM), hard drive storage, temporary storage, non-volatile memory, flash memory, optical memory, or any other suitable memory for storing software objects and/or computer instructions. Memory 510 may include database components, object code components, script components, or any other type of information structure for supporting the various activities and information structures described in the present disclosure. Memory 510 can be communicably connected to processor 508 via processing circuit 506 and may include computer code for executing (e.g., by processor 508) one or more processes described herein. When processor 508 executes instructions stored in memory 510, processor 508 generally configures actuator 502 (and more particularly processing circuit 506) to complete such activities.

Main actuator controller 532 may be configured to receive external control data 516 (e.g., position setpoints, speed setpoints, etc.) from communications circuit 512 and position signals 524 from position sensors 522. Main actuator controller 532 may be configured to determine the position of BLDC motor 528 and/or drive device 530 based on position signals 524. In some embodiments, main actuator controller 532 receives data from additional sources. For example, motor current sensor 518 may be configured to measure the electric current provided to BLDC motor 528. Motor current sensor 518 may generate a feedback signal indicating the motor current 520 and may provide this signal to main actuator controller 532 within processing circuit 508.

Still referring to FIG. 5, processing circuit 508 may be configured to output a pulse width modulated (PWM) DC motor command 534 to control the speed of the BLDC motor. BLDC motor 528 may be configured to receive a three-phase PWM voltage output (e.g., phase A, phase B, phase C) from motor drive inverter 526. The duty cycle of the PWM voltage output may define the rotational speed of BLDC motor 528 and may be determined by processing circuit 506 (e.g., a microcontroller). Processing circuit 506 may increase the duty cycle of the PWM voltage output to increase the speed of BLDC motor 528 and may decrease the duty cycle of the PWM voltage output to decrease the speed of BLDC motor 528.

BLDC motor 528 may be coupled to drive device 530. Drive device 530 may be a drive mechanism, a hub, or other device configured to drive or effectuate movement of a HVAC system component (e.g., equipment 504). For example, drive device may be configured to receive a shaft of a damper, a valve, or any other movable HVAC system component in order to drive (e.g., rotate) the shaft. In some embodiments, actuator 502 includes a coupling device configured to aid in coupling drive device 530 to the movable HVAC system component. For example, the coupling device may facilitate attaching drive device 530 to a valve or damper shaft. In some embodiments, equipment 504 is a 270° rotation 6-way valve. Further details of the 270° valve are included with reference to FIGS. 7A-7D below.

Position sensors 522 may include Hall effect sensors, potentiometers, optical sensors, or other types of sensors configured to measure the rotational position of BLDC motor 528 and/or drive device 530. Position sensors 522 may provide position signals 524 to processing circuit 506. Main actuator controller 532 may use position signals 524 to determine whether to operate BLDC motor 528. For example, main actuator controller 532 may compare the current position of drive device 530 with a position setpoint received via external data input 516 and may operate BLDC motor 528 to achieve the position setpoint.

Actuator 502 is further shown to include a communications circuit 512. Communications circuit 512 may be a wired or wireless communications link and may use any of a variety of disparate communications protocols (e.g., BACnet, LON, WiFi, Bluetooth, NFC, TCP/IP, etc.). In some embodiments, communications circuit 512 is an integrated circuit, chip, or microcontroller unit (MCU) configured to bridge communications actuator 502 and external systems or devices. In some embodiments, communications circuit 512 is the Johnson Controls BACnet on a Chip (JBOC) product. For example, communications circuit 512 can be a pre-certified BACnet communication module capable of communicating on a building automation and controls network (BACnet) using a master/slave token passing (MSTP) protocol. Communications circuit 512 can be added to any existing product to enable BACnet communication with minimal software and hardware design effort. In other words, communications circuit 512 provides a BACnet interface for smart actuator valve device 500. Further details regarding the JBOC product are disclosed in U.S. patent application Ser. No. 15/207,431 filed Jul. 11, 2016, the entire disclosure of which is incorporated by reference herein.

Communications circuit 512 may also be configured to support data communications within actuator 502. In some embodiments, communications circuit 512 may receive internal actuator data 514 from main actuator controller 532. For example, internal actuator data 514 may include the sensed motor current 520, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 504 (e.g., a valve), or any other type of data used or stored internally within actuator 502. In some embodiments, communications circuit 512 may transmit external data 516 to main actuator controller 532. External data 516 may include, for example, position setpoints, speed setpoints, control signals, configuration parameters, end stop locations, stroke length parameters, commissioning data, equipment model data, actuator firmware, actuator software, or any other type of data which can be used by actuator 502 to operate BLDC motor 528 and/or drive device 530.

In some embodiments, external data 516 is a DC voltage control signal. Actuator 502 can be a linear proportional actuator configured to control the position of drive device 530 according to the value of the DC voltage received. For example, a minimum input voltage (e.g., 0.0 VDC) may correspond to a minimum rotational position of drive device 530 (e.g., 0 degrees, −5 degrees, etc.), whereas a maximum input voltage (e.g., 10.0 VDC) may correspond to a maximum rotational position of drive device 530 (e.g., 90 degrees, 95 degrees, etc.). Input voltages between the minimum and maximum input voltages may cause actuator 502 to move drive device 530 into an intermediate position between the minimum rotational position and the maximum rotational position. In other embodiments, actuator 502 can be a non-linear actuator or may use different input voltage ranges or a different type of input control signal (e.g., AC voltage or current) to control the position and/or rotational speed of drive device 530.

In some embodiments, external data 516 is an AC voltage control signal. Communications circuit 512 may be configured to transmit an AC voltage signal having a standard power line voltage (e.g., 120 VAC or 230 VAC at 50/60 Hz). The frequency of the voltage signal can be modulated (e.g., by main actuator controller 532) to adjust the rotational position and/or speed of drive device 530. In some embodiments, actuator 502 uses the voltage signal to power various components of actuator 502. Actuator 502 may use the AC voltage signal received via communications circuit 512 as a control signal, a source of electric power, or both. In some embodiments, the voltage signal is received from a power supply line that provides actuator 502 with an AC voltage having a constant or substantially constant frequency (e.g., 120 VAC or 230 VAC at 50 Hz or 60 Hz). Communications circuit 612 may include one or more data connections (separate from the power supply line) through which actuator 602 receives control signals from a controller or another actuator (e.g., 0-10 VDC control signals).

Figure 6:
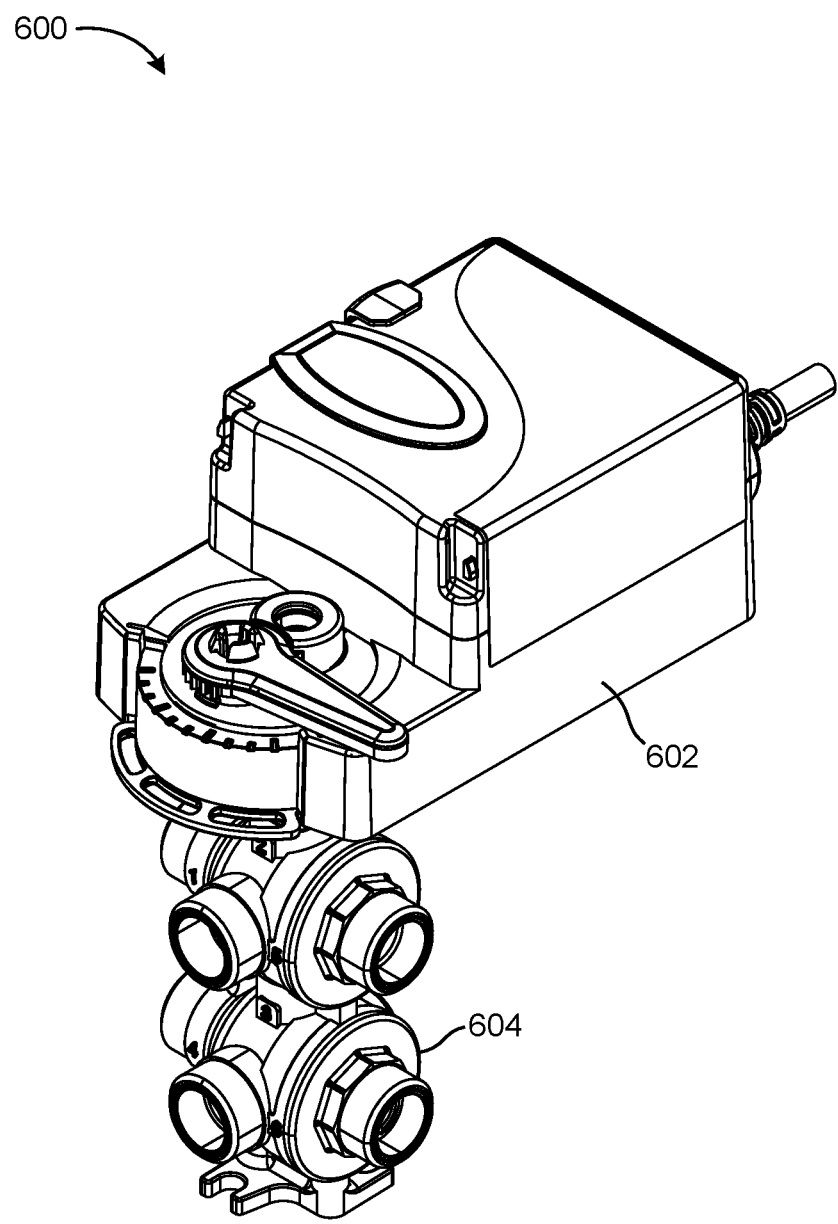
FIG. 6 is a perspective view drawing of the integrated smart actuator device of FIG. 5, according to some embodiments.

Turning now to FIG. 6, a view of a smart actuator and valve assembly 600 is shown, according to some embodiments. Assembly 600 is shown to include a smart actuator 602 coupled to a six-way valve 604. In some embodiments, smart actuator 602 is identical or substantially similar to actuator 502, described above with reference to FIG. 5. Smart actuator 602 may be configured to actuate a valve member of six-way valve 604 and control fluid flow through the valve body.

Figure 7A:
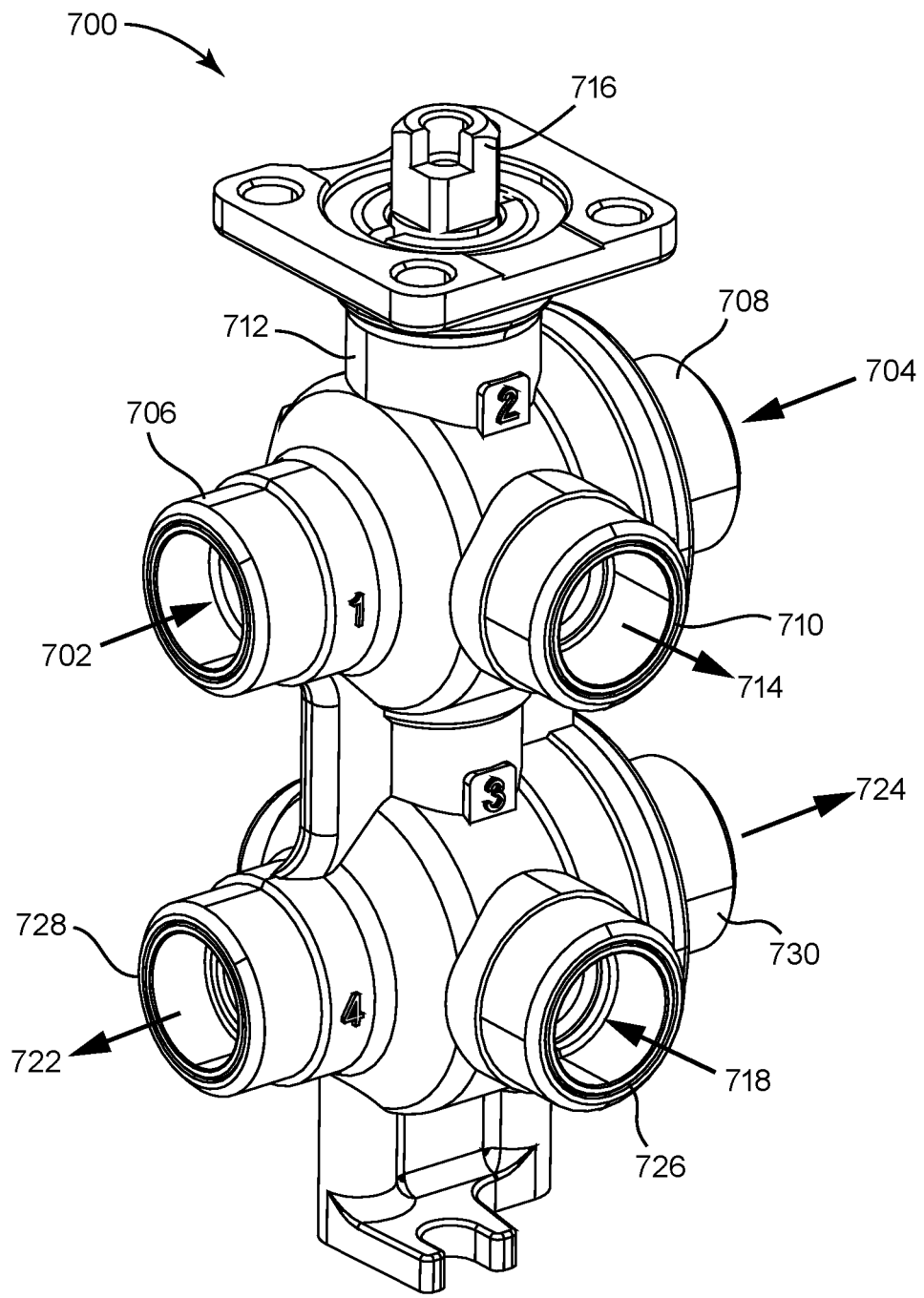
FIG. 7A is a perspective view drawing of a six-way valve configured to simultaneously switch between two fluid supplies and two fluid returns by rotating a single valve member, according to some embodiments.

Referring now to FIG. 7A, a six-way valve 700 is shown according to an exemplary embodiment. In some embodiments, six-way valve 700 is identical or substantially similar to six-way valve 604. Six-way valve 700 is shown to include a six-way valve body 712 and a valve member 716. Six-way valve body 712 may combine two three-way valve bodies in a stacked orientation. In the stacked orientation, a single valve member 716 can be used to control fluid flow through both of the three-way valve bodies. Advantageously, six-way valve body 700 may be controlled by a single actuator acting upon valve member 716.

Six-way valve 700 may be used to switch between two fluid supplies and two fluid returns. For example, six-way valve 700 may be configured to receive first fluid supply 702 at first supply port 706 and to receive second fluid supply 704 at second supply port 708. As shown, first port 706 and second port 708 may be inline ports (e.g., aligned with a common axis) and may be located on opposites sides of the valve chamber. Valve member 716 may include a ball member and a valve stem and may be rotated to selectively control fluid flow from either first supply port 706 or second supply port 708 to outlet port 710 (e.g., without mixing). As such six-way valve 700 may be usable with a four-pipe system to enable selective delivery of hot and cold fluid to a fluid circuit. For example, cold fluid supply and return lines may be connected to ports 706 and 728, hot fluid supply and return lines may be connected to ports 704 and 730, and the fluid circuit may be connected to ports 710 and 726.

Outlet port 710 may be a transverse port (e.g., not inline with ports 706 and 708). As shown, outlet port 710 is substantially perpendicular to ports 706 and 708 and in the same plane as ports 706 and 708. In other embodiments, outlet port 710 may be oriented at a variety of different angles relative to ports 706 and 708 and may not be in the same plane as ports 706 and 708. Outlet port 710 may connect to a fan coil unit (e.g., via a coil supply line). The fluid from outlet port 710 may pass through a fan coil unit and return to valve 700 at return port 726. Valve member 716 may be rotated to selectively divert fluid from return port 726 to either first return port 728 or second return port 730. Return ports 728 and 730 may be fluidly connected to returns 722 and 724, respectively.

In various embodiments, the plurality of ports 706-730 may include any number of ports (e.g., two ports, three ports, four ports, six ports, twenty ports, etc.). Ports 706-730 may be configured to connect to pipes, tubes, or other fluid control components. Ports 706-730 may be configured to connect with fluid pipelines using threadings, compression fittings, glue, cement, flanges, welding, or other fasteners.

Still referring to FIG. 7, valve 700 is shown to include valve member 716. Valve member 716 may include a ball member and a valve stem. The ball member may be substantially spherical. The substantially spherical ball member may result in valve 700 being characterized as a ball valve. In various embodiments, the ball member may be fixedly attached to the valve stem or combined with the valve stem into a single component. The valve stem may extend through valve body 712 and connect to a handle or actuator (e.g., smart actuator 602) for controlling the rotation of the ball member.

In operation, valve member 716 may be located at least partially within the internal valve chamber. Valve member 716 may be controllably movable (e.g., in rotation, in linear movement, etc.) relative to valve body 712 to modulate fluid flow through valve 700. By rotating valve member 716 relative to valve body 712, fluid flow can be selectively controlled (e.g., diverted, adjusted, increased, decreased, etc.) between the plurality of ports 706-730.

The ball member may include a passage that permits fluid to flow through the ball member. In some embodiments, the passage is L-shaped (e.g., having two openings and a single ninety degree bend). The passage may be formed by drilling two bores into the ball member at approximately 90 degrees relative to each other. The bores may connect to form the passage through the ball member. Conventional ball valves may have bores with a substantially circular-shaped cross section. In other embodiments, the bore may have a substantially oval-shaped cross section. In various embodiments, the bore passage may be T-shaped (e.g., having a main bore straight through the ball member and a second bore extending perpendicularly from one side of the main bore), X-shaped (e.g., having two bores extending through the ball member and intersecting as a ninety degree angle) or having any other shape.

The passage through the ball member may be controllably aligned (e.g., partially aligned, fully aligned, etc.) with ports 706-730 to form a fluid connection between pairs of ports. For example, the passage may be rotated into alignment with either first port 706 and third port 710, or second port 708 and third port 710. Under the six-way valve configuration of valve 700, the passage may additionally be rotated into alignment with either return port 726 and first return port 728, or return port 726 and second return port 730.

Referring now to FIGS. 7B-7D, views of a smart actuator device 732 coupled to a 2700 rotation six-way valve 700 are depicted, according to some embodiments. As shown, in order to switch from cold water flow (see FIG. 7B) to hot water flow (see FIG. 7D), the smart actuator 732 device rotates the valve member 716 270° from its original orientation. Conventional actuators often utilize 90° rotation of the valve member when switching from cold to hot flow, which may result in undesirable mixing of the cold and hot flows. By rotating the valve member 716 a full 270°, the cold flow is completely shut off before the hot flow begins to open (see FIG. 7C), and any mixing of the two fluid supplies is avoided. Because the two fluid supplies are not mixed, the 270° valve has a higher flow capacity than comparable 270° valves.

In some embodiments, the smart actuator device includes a capacitor that permits the 270° six-way valve to fail in a closed position when external power to the smart actuator device is removed regardless of whether the valve is operating in a cold flow position or a hot flow position. The capacitor may store energy when fully charged and provide power to the actuator motor to drive the actuator when external power is removed. When power is removed, actuator firmware rotates the valve member to a mid-stroke position which corresponds to the valve closed position. In other embodiments, the actuator firmware may be configured to rotate the valve member to an open position. In various embodiments, the actuator may drive the valve member clockwise or counterclockwise to reach the fail safe position depending on whether the valve is operating in the cold flow position or the hot flow position when power is removed.

Implementations of the Smart Actuator Device in Building Management Systems

Figure 8:
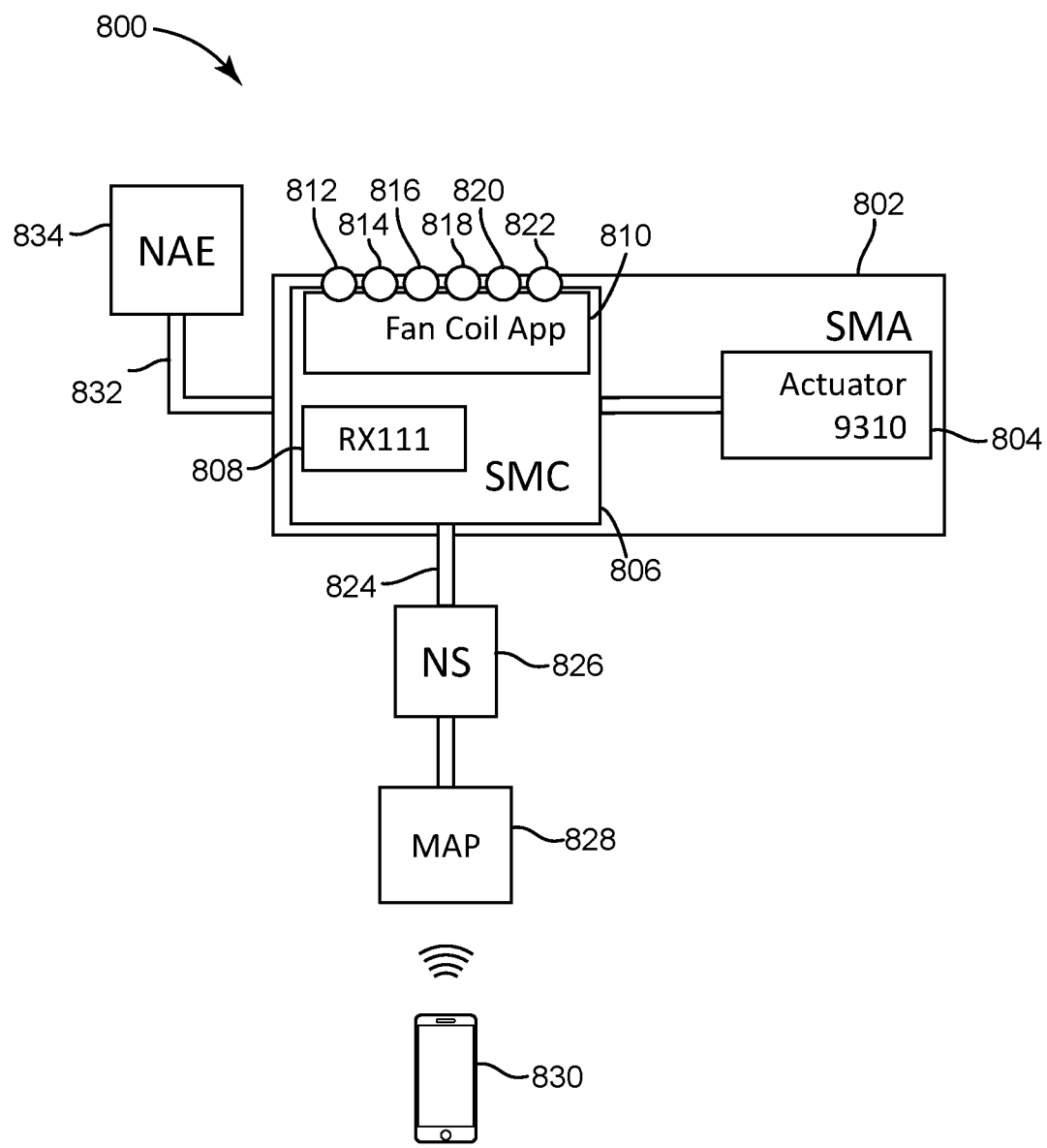
FIG. 8 is a block diagram of an implementation of the integrated smart actuator device in a BMS, according to some embodiments.

Turning now to FIG. 8, an implementation of a smart actuator valve device in a building management system 800 is shown, according to some embodiments. In various embodiments, BMS 800 is a subcomponent of BMS 400, described above with reference to FIG. 4. BMS 800 is shown to include a smart modular assembly (SMA) device 802, a network sensor 826, a mobile access point (MAP) device 828, a mobile device 830, and a network automation engine (NAE) 834.

SMA device 802 is shown to include an actuator 804 and a smart modular controller (SMC) 806. Actuator 804 may be any type of actuator configured to operate an HVAC component (e.g., a valve, a damper). For example, in some embodiments, actuator 804 is a 9310 Series non-spring return valve actuator manufactured by Johnson Controls, Inc. SMC 806 is shown to include a microcontroller 808 and a fan coil application 810 with input signals 812-814 and output signals 816-822. In various embodiments, actuator 804 communicates with SMC 806 using the universal asynchronous receiver/transmitter (UART) protocol.

Microcontroller 808 may be an integrated circuit with memory and a processor configured to execute an application. Memory may include one or more devices (e.g., memory units, memory devices, storage devices, etc.) for storing data and/or computer code for completing and/or facilitating the various processes described in the present disclosure. Memory may be random access memory (RAM), read-only memory (ROM), hard drive storage, temporary storage, non-volatile memory, flash memory, optical memory, or any other suitable memory for storing software objects and/or computer instructions. In some embodiments, microcontroller 808 is an RX111 Group microcontroller manufactured by Renesas Electronics.

SMC 806 may be configured to execute fan coil application 810 to enable closed loop control of a fan coil. Fan coil application 810 may be configured to receive input signals (e.g., universal input (UI) signals 912-914 regarding discharge air temperature and condensation properties). Fan coil application 810 may be further configured to output control signals (e.g., analog output (AO) signals 816-818, control output (CO) signal 820, and relay 822) for a fan coil unit. In various embodiments, application 810 may be configured to control other HVAC components (e.g., blower coils, air handling units (AHUs)).

SMC 806 is shown to be communicably coupled to a network sensor 826 via sensor actuator (SA) bus 824. SA bus 824 may operate according to master slave token passing (MSTP) protocols. Network sensor 826 may be configured to measure various properties (e.g., air temperature, zone humidity, local temperature setpoint adjustments) and communicate the measured data with SMA device 802. In some embodiments, network sensor 826 is an NS series sensor manufactured by Johnson Controls, Inc. Network sensor 826 may be coupled to MAP device 828 (e.g., via an RJ jack). MAP device 828 may permit wireless configuration of SMA device 802 via mobile device (e.g., mobile device 830). In some embodiments, MAP device 828 is manufactured by Johnson Controls, Inc. Further details of the MAP device may be found in U.S. patent application Ser. No. 15/261,843 filed Sep. 9, 2016. The entire disclosure of U.S. patent application Ser. No. 15/261,843 is incorporated by reference herein.

BMS 800 is also shown to include mobile device 830 and NAE 834. Mobile device 830 may be configured to receive user input regarding the configuration of SMA device 802. In various embodiments, mobile device 830 may be a mobile phone, a smartphone, a PDA, a laptop computer, or any other mobile device configured to receive input from a user. NAE 834 may provide comprehensive equipment monitoring and control through features like scheduling, alarm and event management, energy management, data exchange, data trending, and data storage. NAE 834 may communicate with SMA device 802 via field bus 832 using MSTP protocols. In some embodiments, NAE 834 is manufactured by Johnson Controls, Inc. and can be implemented as part of a METASYS® brand building automation system, as sold by Johnson Controls, Inc.

Figure 9:
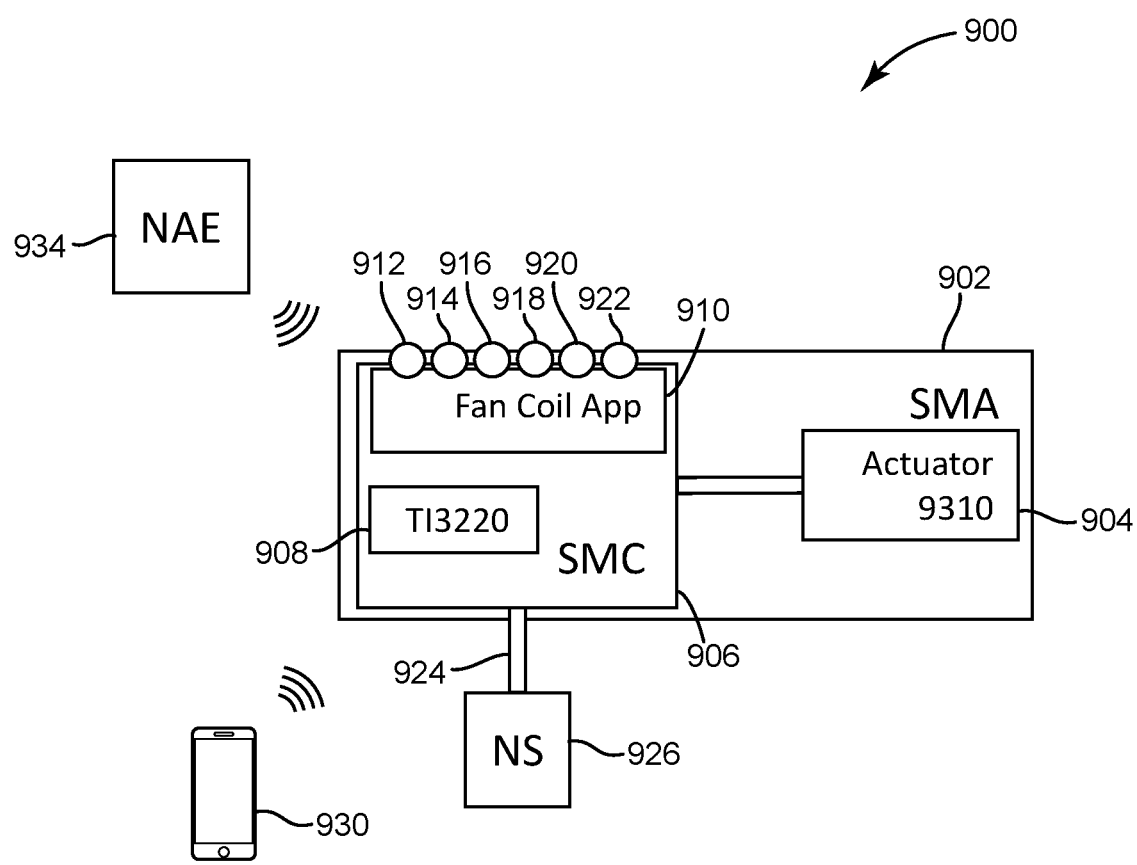
FIG. 9 is another block diagram of an implementation of the integrated smart actuator device in a BMS, according to some embodiments.

Referring now to FIG. 9, another implementation of a smart actuator device in a building management system 900 is shown, according to some embodiments. BMS 900 is shown to include SMA device 902, a network sensor 926, a mobile device 930, and a NAE 934. In various embodiments, network sensor 926, mobile device 930, and NAE 934 are identical or substantially similar to the network sensor 826, mobile device 830, and NAE 834 described above with reference to FIG. 8.

SMA device 902 is shown to include an actuator 904 and an SMC 906. In some embodiments, actuator 904 is identical or substantially similar to actuator 804, while fan coil application 910 with input signals 912-914 and output signals 916-922 are identical or substantially similar to fan coil application 810 with input signals 812-814 and output signals 816-822. However, SMC 906 is additionally shown to include microprocessor 908. Microprocessor 908, like microprocessor 808 described above, may be an integrated circuit with memory and a processor configured to execute an application (e.g., fan coil application 910). However, microprocessor 908 may include functionality that permits SMA device 902 to communicate with other devices via wireless network (e.g, WiFi). Since wireless functionality is embedded within SMC 906, SMA device 902 does not require connection to a MAP device via network sensor 926, and SMA device 902 may communicate directly with NAE 934 (e.g., via WiFi). In some embodiments, microprocessor 908 is a TI3220 microprocessor manufactured by Texas Instruments.

Figure 10:
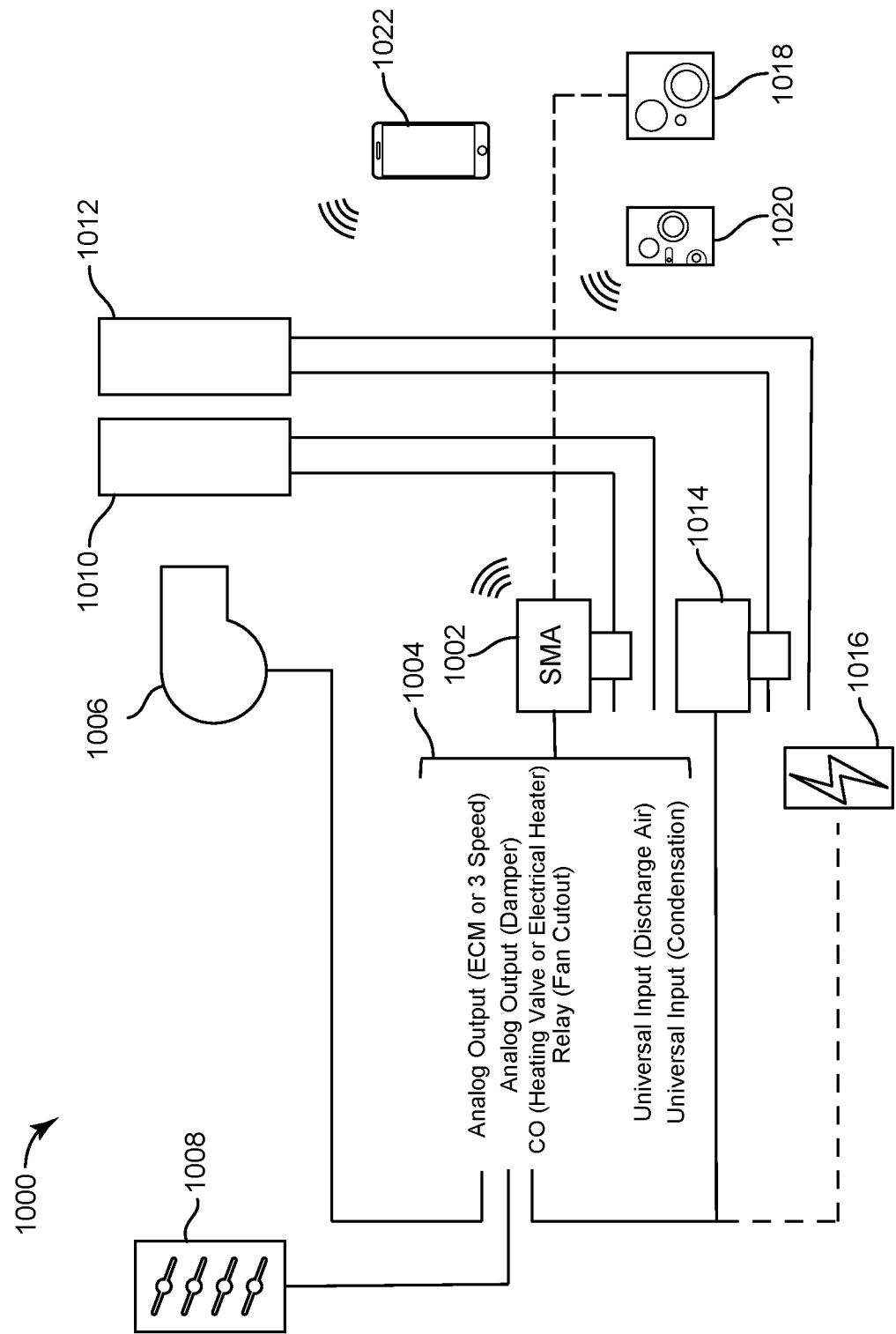
FIG. 10 is another block diagram of an implementation of the integrated smart actuator device in a BMS, according to some embodiments.

Turning now to FIG. 10, another implementation of a smart actuator valve device in a building management system 1000 is shown, according to some embodiments. In some embodiments, BMS 1000 is a subcomponent of BMS 400, described above with reference to FIG. 4. In other embodiments, BMS 1000 may be a component of a modular liquid-based cooling system. Further details of the modular liquid-based cooling system may be found in U.S. patent application Ser. Nos. 14/771,325 and 14/771,341 filed Mar. 4, 2014. The entire disclosures of U.S. patent application Ser. Nos. 14/771,325 and 14/771,341 are incorporated by reference herein. BMS 1000 is shown to include, among other components, an SMA device 1002, SMA input/output signals 1004, fan 1006, damper 1008, cooling coil 1010, heating coil 1012, heating valve 1014. In some embodiments, SMA device 1002 controls the flow of liquid through cooling coil 1010, while heating valve 1014 controls the flow of liquid though heating coil 1012. In various embodiments, SMA device 1002 and/or heating valve 1014 may be coupled to or may be a 270° valve (e.g., valve 700, described above with reference to FIGS. 7A-7D). The one or more 270° valves may control flow through cooling coil 1010 and heating coil 1012. In alternative embodiments, BMS 1000 includes electric heater device 1016 in place of heating coil 1012 and heating valve 1014.

SMA device 1002 may be identical or substantially similar to SMA devices 802 and 902, described with reference to FIGS. 8 and 9 above. The embedded processing power of SMA device 1002 causes SMA device 1002 to receive and transmit SMA input/output signals 1004. SMA input/output signals 1004 may include two universal inputs representative of discharge air and condensation properties. SMA input/output signals 1004 may further include the following outputs: an analog output signal to fan 1006 (depending on the fan motor, either an electrically commutated motor (ECM) or three-speed signal), a fan cutout relay, an analog output to damper 1008, and a CO to either heating valve 1014 or electric heater 1016.

Still referring to FIG. 10, BMS 1000 is further shown to include thermostat 1018, wireless thermostat 1020, and mobile device 1022. Both thermostat 1018 and/or wireless thermostat 1020 may be configured to receive user input regarding user controls and/or preferences such as desired room temperature, desired room humidity, fan speed and occupancy status. Thermostat 1018 may communicate with SMA 1002 via wired connection, while wireless thermostat 1020 may communicate with SMA 1002 via wireless network (e.g., WiFi). Mobile device 1022 may be configured to receive user input regarding the configuration of SMA device 1002. In various embodiments, mobile device 1022 may be a mobile phone, a smartphone, a PDA, a laptop computer, or any other mobile device configured to receive input from a user.

Figure 11:
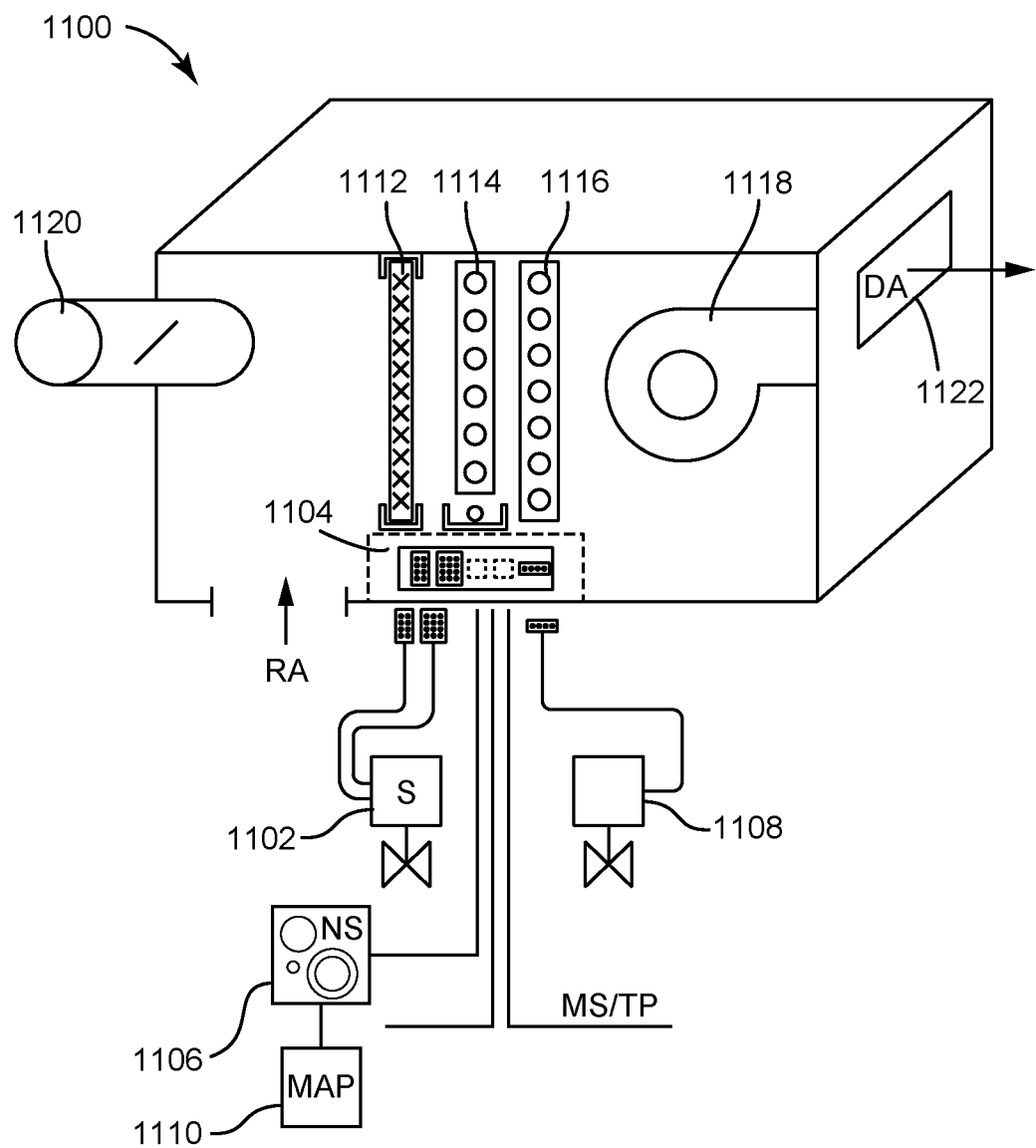
FIG. 11 is a block diagram of an implementation of the integrated smart actuator device in an air handling unit (AHU), according to some embodiments.

Referring now to FIG. 11, a block diagram of an implementation of the smart actuator device in an air handling unit (AHU) 1100 is depicted, according to some embodiments. AHU 1100 is shown to include a smart actuator device 1102 connected to a junction board 1104. Junction board 1104 may be a small two-sided junction board that protrudes through the side of the electrical cabinet of AHU 1100. In addition to the smart actuator device 1102, junction board 1104 may be connected to a network sensor 1106 and a hot water valve driven by a slave actuator 1108. The network sensor 1106 may be connected to a MAP device 1110, and in some embodiments, the network sensor may be a thermostat. In various embodiments, junction board 1104 may include other connectors that provide connections to devices on the SA bus utilizing MSTP protocols. In some embodiments, all of the components of junction board 1104 are included within the smart actuator device 1102.

AHU 1100 is further shown to include a filter 1112, a chilled water coil 1114, a hot water coil 1116, and a fan 1118 within the AHU electrical cabinet. The chilled water coil 1114 may be controlled by smart actuator device 1102, while the hot water coil 1116 may be controlled by hot water valve 1108. In some embodiments, AHU 1100 may be supplied by outdoor air that is controlled via outdoor air damper 1120. Outdoor air may pass through filter 1112 and past chilled water coil 1114 and hot water coil 1116 before exiting the AHU discharge via the fan 1118. In some embodiments, AHU 1100 includes a discharge air temperature sensor 1122. Measurements from discharge air temperature sensor 1122 may be provided to smart actuator device 1102, and the operation of chilled water coil 1114 and hot water coil 1116 may be adjusted by smart actuator device 1102 and hot water valve 1108 based on the discharge temperature feedback from sensor 1122.

Figure 12A:
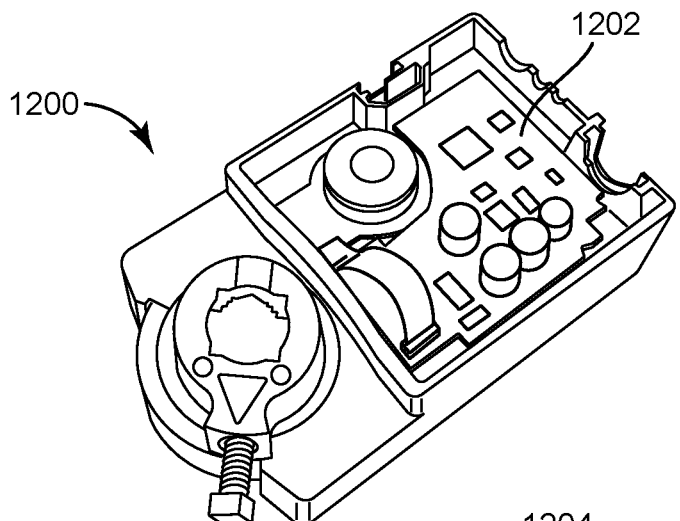
FIGS. 12A-12C are a series of depictions of the circuit card assemblies that may be included in the integrated smart actuator device, according to some embodiments.
Figure 12B:
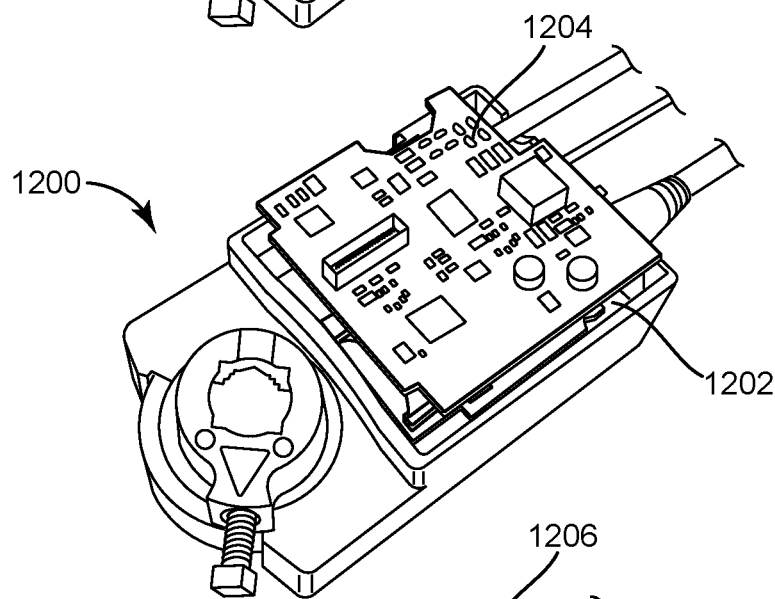
Figure 12C:
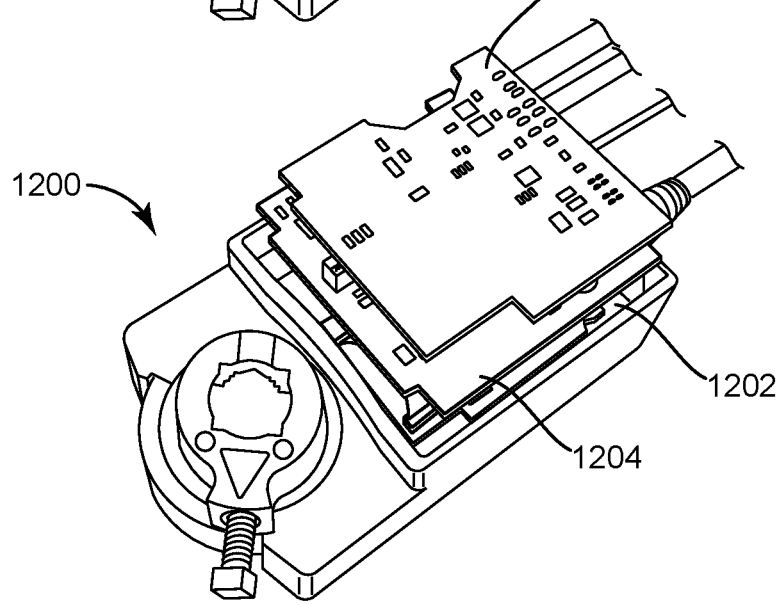

Turning now to FIGS. 12A-12C, the circuit card assemblies that may be included in the smart actuator device are shown, according to some embodiments. For example, FIG. 12A depicts the actuator circuit card assembly 1202. Actuator circuit card assembly 1202 may contain all functionality required to drive the mechanical components of the actuator. As shown in FIG. 12B, smart modular controller (SMC) circuit card assembly 1204 may be stacked above the actuator circuit card assembly 1202. SMC circuit card assembly 1204 may contain all functionality required for the smart actuator device to perform processing and control loop functions. Finally, as shown in FIG. 12C, IO circuit card assembly 1206 may be stacked above the SMC circuit card assembly 1204. IO circuit card assembly 1206 may contain all functionality required to permit the smart actuator device to interface with other devices (e.g., network sensors, MAP devices, etc.).

Each of the actuator circuit card assembly 1202, the SMC circuit card assembly 1204, and the IO circuit card assembly 1206 may be coupled to each other via board-to-board connectors. As described above, the smart actuator device may be modular, and different versions of the actuator circuit card assembly 1202, the SMC circuit card assembly 1204, and the IO circuit card assembly 1206 may be utilized to ensure the smart actuator device can perform all desired functions. For example, if the smart actuator device requires wireless communications functionality without the use of a MAP device, a version of SMC circuit card assembly 1204 containing the TI3220 microprocessor (described above with reference to FIG. 9) may be installed in the smart actuator device, as opposed to a version of the SMC circuit card assembly 1204 containing the RX111 microprocessor (described above with reference to FIG. 8).

Figure 13:
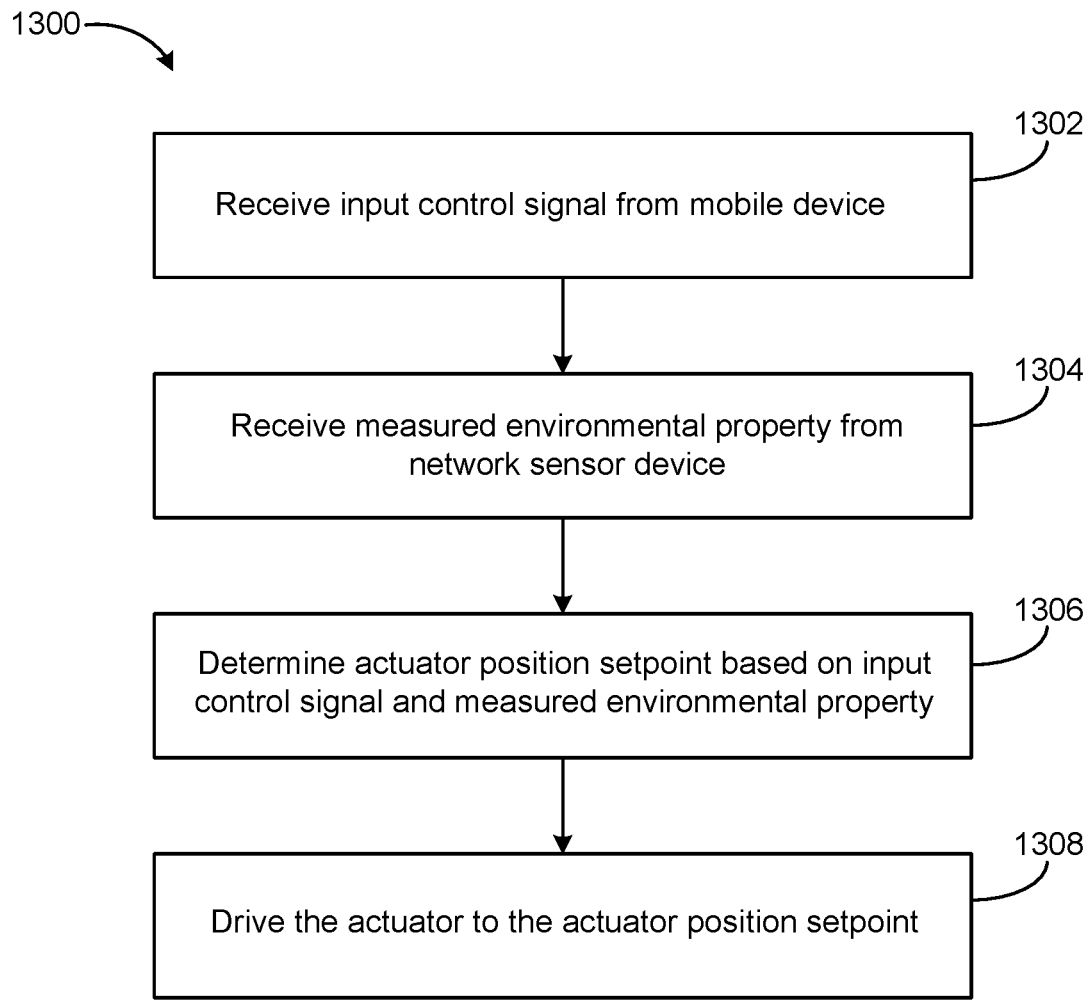
FIG. 13 is a flow diagram of a method of operating an integrated smart actuator device, according to some embodiments.

Referring now to FIG. 13, a flow diagram of a process 1300 for operating a smart actuator device is shown, according to an exemplary embodiment. In various embodiments, process 1300 may be performed by a controller of a smart actuator device (e.g., SMC 806 of SMA device 802, SMC 906 of SMA device 902). At step 1302, the controller receives an input control signal from a mobile device, and at step 1304, the controller receives a measured environmental property from a network sensor device (e.g., NS 826, NS 926). In various embodiments, the measured environmental property may be an air temperature, a zone humidity, or a local temperature.

Continuing with step 1306, the controller determines an actuator position setpoint based on the input control signal and the measured environmental property. In various embodiments, the actuator position setpoint determined by the controller may be expressed in a variety of ways, including number of degrees of rotation of a drive device relative to a fixed position (e.g., a zero location, a mechanical end stop, etc.) a number of revolutions of the motor, a number of Hall sensor counts, etc. Process 1300 may conclude with step 1308, in which the controller drives the drive device to the actuator position setpoint. In various embodiments, the drive device may be coupled to a valve assembly or a damper, and a change in the position of the actuator drive device may result in a change in flow rate through the valve assembly or the damper.

CONFIGURATION OF EXEMPLARY EMBODIMENTS

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for any one or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
    a sensor device configured to measure an environmental property of a building;
    a valve assembly operable to affect a change in the environmental property of the building;
    an actuator device comprising:
        a housing detachably coupleable to the valve assembly;
        a motor and a drive device positioned in the housing, the drive device driven by the motor and detachably coupled to the valve assembly, wherein the drive device is configured to drive a valve member along an angular travel of approximately 270 degrees; and
        a controller positioned in the housing and coupled to the motor, the controller configured to execute a control application configured to perform automatic closed loop control of the motor to drive the drive device to adjust operation of the valve assembly based at least in part on:
            a setting received by the controller in the housing from a mobile device; and
            measurements of the environmental property received at the housing from the sensor device.

2. The building management system of claim 1, further comprising a mobile access point device configured to communicably couple to the sensor device and to receive the setting from the mobile device.

3. The building management system of claim 1, wherein the controller is further configured to wirelessly couple to the mobile device to receive the setting.

4. The building management system of claim 1, wherein the valve assembly includes the valve member rotatable along an angular travel of approximately 270 degrees between a first end position in which a first port is fluidly connected with a third port and a second port is closed and a second end position in which the second port is fluidly connected with the third port and the first port is closed.

5. The building management system of claim 1, further comprising a network automation engine device communicably coupled to the actuator device and configured to perform equipment monitoring and control functions comprising at least one of a scheduling function, an alarm management function, an event management function, an energy management function, a data exchange function, a data trending function, and a data storage function.

6. The building management system of claim 1, wherein the valve assembly is configured to control a flow of water through at least one of a heating coil and a cooling coil.

7. The building management system of claim 1, wherein the controller is communicably coupled to a plurality of input and output signals.

8. The building management system of claim 7, wherein the plurality of input and output signals comprise at least one of a discharge air input signal, a condensation input signal, an analog fan output signal, a fan cutout relay output signal, and an analog damper output signal.

9. The system of claim 1, wherein the sensor device provides the environmental property to the actuator device via master slave token passing (MSTP) protocol.

10. The system of claim 1, wherein the actuator device is configured to drive the valve member to a closed position when external power to the actuator device is removed, wherein driving the valve member to the closed position is based on a capacitor.

11. A method for controlling a building management system comprising a valve assembly, an actuator device comprising a housing detachably coupled to the valve assembly, and a sensor device, the method comprising:
receiving, at a controller in the housing, a setting from a mobile device;
receiving, at the controller in the housing, a measured environmental property from the sensor device;
determining, by the controller of the actuator device positioned in the housing, an actuator position setpoint based on the setting and the measured environmental property; and
automatically driving, by a motor positioned in the housing and controlled by the controller, a drive device of the actuator device to the actuator position setpoint, wherein:
driving the drive device of the actuator device to the actuator position setpoint results in a change in operation of the valve assembly, and
the drive device is configured to drive a valve member along an angular travel of approximately 270 degrees.

12. The method of claim 11, wherein the valve assembly comprises:
a valve body having a valve chamber and a plurality of ports into the valve chamber; and
the valve member located within the valve chamber, wherein the valve member is controllably rotatable about a rotational axis.

13. The method of claim 12, wherein the valve member is rotatable along an angular travel of approximately 270 degrees between a first end position in which a first port is fluidly connected with a third port and a second port is closed and a second end position in which the second port is fluidly connected with the third port and the first port is closed.

14. The method of claim 11, wherein the method is performed at least in part by a controller of the actuator device.

15. The method of claim 14, wherein the controller of the actuator device comprises:
a microcontroller comprising memory and a processor configured to execute a control application; and
a control application configured to enable closed loop control of the valve assembly.

16. A modular actuator device for use in a building management system configured to modify an environmental condition of a building, the modular actuator device comprising:
a chassis detachably coupleable to a valve assembly;
an actuator motor coupled to the chassis and configured to drive a drive device;
an actuator circuit card assembly detachably coupled to the chassis and comprising a plurality of components configured to drive the actuator motor;
a processor circuit card assembly detachably coupled to the chassis and comprising a plurality of components configured to automatically perform closed loop control functions; and
an input output circuit card assembly detachably coupled to the chassis and comprising a plurality of components configured to communicably couple the modular actuator device to a plurality of input and output signals;
wherein each of the actuator circuit card assembly, the processor circuit card assembly, and the input output circuit card assembly are configured to be separately replaceable to achieve one or more desired functions of the modular actuator device;
wherein the drive device is configured to drive a valve member along an angular travel of approximately 270 degrees.

17. The modular actuator device of claim 16, wherein the plurality of input and output signals comprise at least one of a discharge air input signal, a condensation input signal, an analog fan output signal, a fan cutout relay output signal, and an analog damper output signal.

18. The modular actuator device of claim 16, wherein the plurality of components configured to drive the actuator motor cause the actuator motor to drive the drive device along an angular travel of approximately 270 degrees.

19. The modular actuator device of claim 16, wherein the plurality of components configured to perform closed loop control functions comprise a microprocessor.

20. The modular actuator device of claim 19, wherein the microprocessor is configured to wirelessly couple to a mobile device to receive an input control signal.

21. The modular actuator device of claim 19, wherein the microprocessor is configured to wirelessly couple to a network automation engine device configured to perform equipment monitoring and control functions comprising at least one of a scheduling function, an alarm management function, an event management function, an energy management function, a data exchange function, a data trending function, and a data storage function.

* * * * *